S. D. CLARK.
TRAP ATTACHMENT FOR FLY SCREENS.
APPLICATION FILED MAR. 25, 1911.
1,037,727.
Patented Sept. 3, 1912.
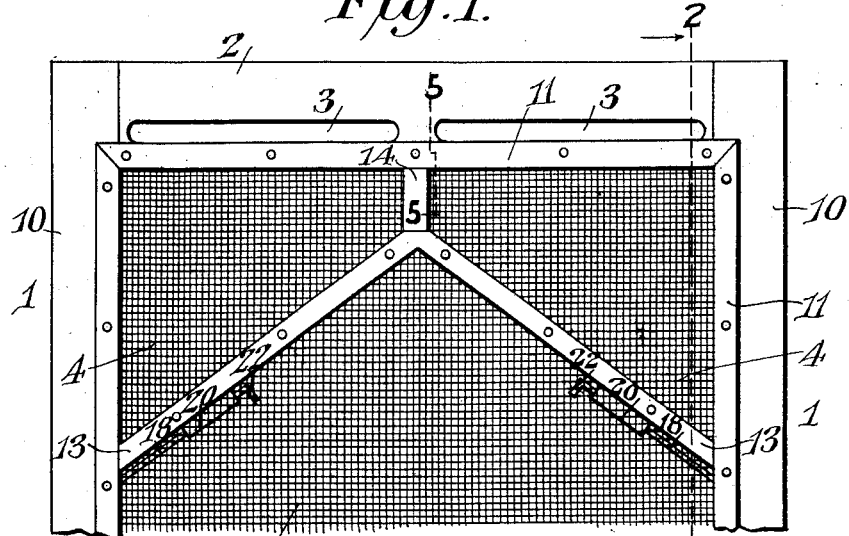
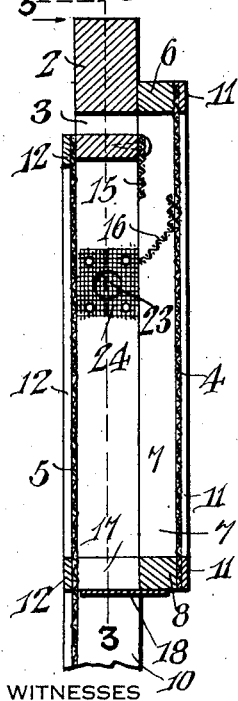
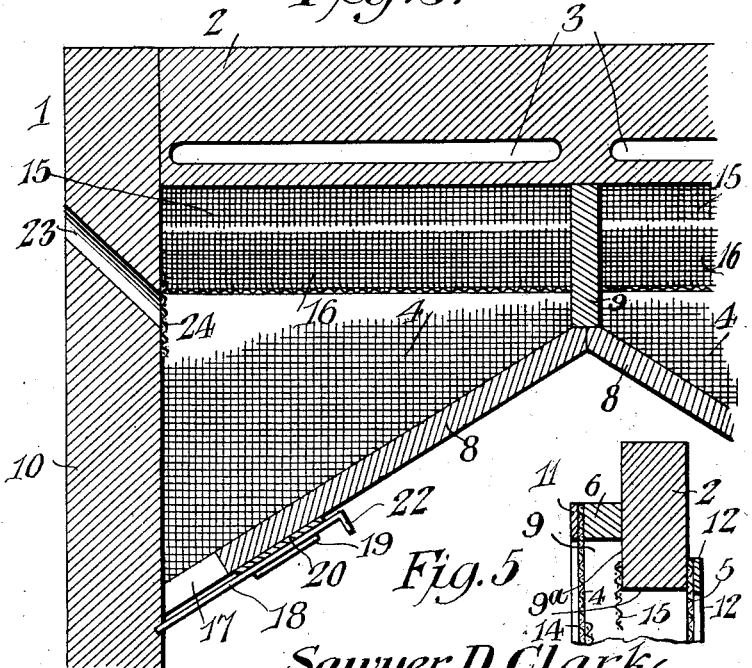
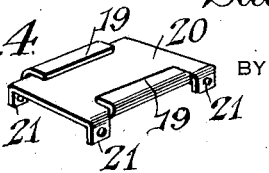
Sawyer D. Clark,
INVENTOR
WITNESSES
BY
ATTORNEY
COLUMBIA PLANOGRAPH CO., WASHINGTON, D. C.

UNITED STATES PATENT OFFICE.

SAWYER D. CLARK, OF BOULDER, COLORADO.

TRAP ATTACHMENT FOR FLY-SCREENS.

1,037,727. Specification of Letters Patent. Patented Sept. 3, 1912.

Application filed March 25, 1911. Serial No. 616,930.

*To all whom it may concern:*

Be it known that I, SAWYER D. CLARK, a citizen of the United States, residing at Boulder, in the county of Boulder and State of Colorado, have invented a new and useful Trap Attachment for Fly-Screens, of which the following is a specification.

The invention relates to improvements in trap attachments for fly screens.

The object of the present invention is to improve the construction of trap attachments for fly screens, and to provide a simple, inexpensive and easily constructed fly trap, adapted to be readily applied to door and window screens without necessitating any alteration in the construction of such screens and without cutting the wire gauze and permitting the same to bag.

A further object of the invention is to provide a trap attachment adapted to present a neat and attractive appearance, and capable of bracing a door or window screen and of preventing the same from sagging.

The invention also has for its object to provide a fly trap, equipped with means for enabling the captured insects to be easily destroyed and readily removed.

With these and other objects in view, the invention consists in the construction and novel combination of parts hereinafter fully described, illustrated in the accompanying drawing, and pointed out in the claims hereto appended; it being understood that various changes in the form, proportion, size and minor details of construction, within the scope of the claims, may be resorted to without departing from the spirit or sacrificing any of the advantages of the invention.

In the drawing:—Figure 1 is a front elevation of a portion of a screen door equipped with a trap attachment, constructed in accordance with this invention. Fig. 2 is a vertical sectional view on the line 2—2 of Fig. 1. Fig. 3 is a vertical sectional view on the line 3—3 of Fig. 2. Fig. 4 is a detail perspective view of one of the guide plates. Fig. 5 is a detail sectional view on the line 5—5 of Fig. 1.

Like numerals of reference designate corresponding parts in all the figures of the drawing.

In the accompanying drawing in which is illustrated the preferred embodiment of the invention, 1 designates a screen door frame of the ordinary construction, provided in its top bar 2 with spaced horizontal slots 3, which may be easily cut into the screen door frame to form entrances to the trap attachment. The trap attachment comprises a sheet 4 of wire gauze, or other suitable screen material, arranged in spaced relation with the inner face of the wire gauze 5 of the screen door and supported by a frame comprising a horizontal top bar 6, vertical side bars 7, oppositely inclined bottom bars 8, and a central vertical division piece 9, which divides the trap attachment into two separate compartments. The horizontal top bar of the trap frame is secured to the inner face of the horizontal bar 2 of the screen door frame at a point above the entrance slots, as clearly illustrated in Fig. 2 of the drawing, and the vertical side bars 7 of the trap frame are secured to the side bars 10 of the screen door frame in flush relation with the inner side edges of the said bars 10. The oppositely inclined bottom bars 8 extend upwardly and inwardly from the side bars 7 and 10, and they have their upper ends fitted together and abutting against the lower edge of the central vertical division piece 9. The central vertical division piece is provided at the top with a recess 9ª to fit the top bar 2 of the screen door frame, and it extends upward on the top bar 2 to the top bar 6 of the trap frame. The extended upper portion of the division piece is arranged at the solid portion of the top bar 2 between the slots 3 thereof.

The sheet 4 of the screen material, which is supported by the trap frame, conforms to the configuration of the same and is secured to the outer faces or edges of the bars of the trap frame, preferably by means of thin wooden strips 11, which conceal the edges of the wire gauze 4. The oppositely inclined bottom bars form separate downward tapered pockets, and the flies, which are destroyed by the means hereinafter described, collect in the bottoms of the pockets. The wire gauze 5 of the screen door is also secured at its marginal edges to the door frame by thin wooden strips 12, and the said wire gauze 4 is also secured to the inner edges of the inclined bottom 8 and the central division piece by thin wooden strips 13 and 14. This construction presents a neat and attractive appearance, and the trap frame operates to brace the screen door frame and prevent the same from sagging.

The sheet 4 of wire gauze extends above the horizontal entrance slots 3, and the flies or other insects entering through the slots 3 pass into the compartments of the trap attachment and descend into the relatively large space between the sheets 4 and 5 of wire gauze. In order to prevent the return of the insects to the entrance openings, the top bar of the screen door frame is provided with a depending vertical guard flange 15, consisting of a strip or strips of wire gauze tacked, or otherwise secured to the top bar 2 and projecting below the same and coöperating with guards 16, also consisting of strips of wire gauze having angularly related upper and lower portions, and secured at their terminals to the side bars of the frame and to the central division piece. The upper portion of the guard 16 is arranged contiguous to the inner face of the sheet 4 of wire gauze, and the lower portion of the said guard 16 extends downwardly and inwardly to approximately the vertical plane of the guard flange, as clearly illustrated in Fig. 2 of the drawing. The guard flange 15 and the guard 16 will turn back and flies, attempting to crawl upward to the slots 3 and will prevent the insects from reaching the same.

The lower ends of the inclined bottom bars of the top frame are recessed to overlap the side bars of the screen door frame and also to provide bottom openings 17, which are normally covered by slidable closures 18, arranged at an inclination and mounted in guides formed by inwardly extending flanges 19 of plates 20. The plate 20, which is constructed of sheet metal, is split at opposite sides adjacent to its ends, and the partially severed portions are bent to form the flanges 19 and attaching lugs 21, which are secured to the side edges of the inclined bottom piece. The slidable closures are provided at their upper ends with downwardly bent lips or flanges 22 by means of which they are readily operated, and gravity and frictional engagement and the slidable closures of the guides maintain the same in their normal condition. The slides are adapted to be readily opened to permit dead insects to drop through the bottom openings 17, and the inclined bottom bars will direct the dead insects to the said bottom openings.

The side bar 10 of the screen door frame is provided with inclined bores 23, extending downwardly and inwardly from the exterior of the screen door to the opposite compartments of the trap attachment and adapted to permit insect powder to be introduced into the said compartments for killing the captured insects. The inner or lower ends of the inclined bores or openings 23 are covered by small pieces 24 of fine wire gauze, which prevents the insect powder from discharging into the compartments too rapidly and which also prevents insects from escaping through the inclined bores or openings.

The trap attachment is adapted to be applied to a door or window screen without the aid of a carpenter or other skilled mechanic, as it is only necessary to cut the longitudinal slots in the top of the screen door frame. It is adapted to be mounted on an ordinary screen and does not necessitate discarding the screens, which are in use. The trap attachment does not materially affect the circulation of air through the screen door, and it is arranged in an elevated position out of the way.

Having thus fully described my invention, what I claim as new and desire to secure by Letters Patent, is:—

1. A fly trap comprising a screen composed of a screen frame and screen material covering the space inclosed by the frame, said screen frame being provided at the top beyond the said screen material with a transverse entrance slot, a trap frame including top and side bars secured to the top and sides of the screen frame and inclosing the transverse slot, and bottom bars extending across the space between the sides of the screen frame and secured to the same and fitting against the said screen material, which constitutes the front or outer wall of the trap, screen material secured to the trap frame and covering the space inclosed by the same and the upper portion of the screen frame and constituting the rear or inner wall of the trap.

2. A fly trap comprising a screen composed of a screen frame and screen material covering the space inclosed by the frame, said screen frame being provided at the top beyond the said screen material with spaced horizontal entrance slots, a trap frame including top and side bars secured to the top and sides of the screen frame and inclosing the horizontal slots, and oppositely inclined bottom bars extending across the space between the sides of the screen frame and fitting against the said screen material, the upper ends of the bottom bars forming an apex and the lower ends being secured to the sides of the screen frame, said bottom bars coöperating with the sides of the screen frame to form opposite downwardly tapered pockets and having outlets at the bottom portions of the pockets.

3. A fly trap comprising a screen composed of a screen frame and screen material covering the space inclosed by the frame, said screen frame being provided at the top beyond the said screen material with spaced horizontal entrance slots, a trap frame including top and side bars secured to the top and sides of the screen frame and inclosing the horizontal slots, oppositely inclined bottom bars extending across the space between the sides of the screen frame and fitting against the said screen material, the upper ends of the bottom bars forming an apex and the lower ends being secured to the sides of the screen frame, said bottom bars coöperating with the sides of the screen frame to form opposite downwardly tapered pockets, and a central vertical division piece extending from the upper ends of the inclined bottom bars to the top bars of the screen frame and the trap frame and dividing the trap into two separate compartments, guard flanges located at opposite sides of the division piece and depending from the top bar of the screen frame, and guards located below and spaced from the guard flanges and extending from the division piece to the side bars of the said frame.

In testimony, that I claim the foregoing as my own, I have hereto affixed my signature in the presence of two witnesses.

SAWYER D. CLARK.

Witnesses:
CARL H. TEENOR,
CHARLES F. BARTELL.

Copies of this patent may be obtained for five cents each, by addressing the "Commissioner of Patents, Washington, D. C."